United States Patent [19]

Orr et al.

[11] Patent Number: 4,855,153

[45] Date of Patent: * Aug. 8, 1989

[54] PROLONGING THE SHELF LIFE OF FRESH ROOT VEGETABLES

[75] Inventors: Avigdor Orr, Highland Park; John O. Spingler, Plainsboro; Seymour G. Gilbert, Piscataway, all of N.J.

[73] Assignee: DNA Plant Technology Corporation, Cinnaminson, N.J.

[ * ] Notice: The portion of the term of this patent subsequent to Jun. 2, 2004 has been disclaimed.

[21] Appl. No.: 75,205

[22] Filed: Jul. 17, 1987

Related U.S. Application Data

[63] Continuation of Ser. No. 792,440, Oct. 29, 1985, which is a continuation-in-part of Ser. No. 650,776, Sep. 13, 1984, Pat. No. 4,670,275.

[51] Int. Cl.$^4$ .............................................. A23B 7/148
[52] U.S. Cl. ..................................... 426/270; 426/310; 426/615; 426/410; 426/506
[58] Field of Search ............... 426/270, 273, 419, 615, 426/637, 302, 310, 323, 324, 412

[56] References Cited

U.S. PATENT DOCUMENTS

| | | | |
|---|---|---|---|
| 2,373,521 | 4/1945 | Wigelsworth | 426/520 |
| 2,427,857 | 9/1947 | Hamill | 426/310 |
| 2,515,025 | 7/1950 | Vahl et al. | 426/520 |
| 2,560,820 | 7/1951 | Recker | 426/310 |
| 3,658,559 | 4/1972 | Mohwinkel | 99/100 |
| 3,672,907 | 6/1972 | Hudson | 426/120 |
| 3,801,715 | 4/1974 | Smith | 426/520 |
| 3,814,820 | 6/1974 | Busta | 426/262 |
| 4,001,443 | 1/1977 | Dave | 426/326 |
| 4,135,003 | 1/1978 | Mohwinkel | 426/412 |
| 4,505,937 | 3/1985 | Demeulemeester et al. | 426/520 |
| 4,670,275 | 6/1987 | Orr | 426/615 |

Primary Examiner—Donald E. Czaja
Assistant Examiner—Carolyn Paden
Attorney, Agent, or Firm—Pennie & Edmonds

[57] ABSTRACT

The shelf life of root crops such as raw carrots can be substantially increased by subjecting the raw carrots, in one embodiment, to a process including (a) a mild heat treatment effective to reduce the microflora of the carrots but not to adversely affect the organoleptic qualities of the raw carrots, (b) the rapid cooling of the heat treated vegetable and (c) placing the vegetable in a sealed container to prevent microbial recontamination and maintain the vegetable in a viable condition. In another embodiment, the process includes subjecting the carrots to a vacuum, breaking the vacuum in the presence of water and placing the vegetable in a sealed container to prevent microbial recontamination and maintain the vegetable in a viable condition.

14 Claims, No Drawings

PROLONGING THE SHELF LIFE OF FRESH ROOT VEGETABLES

CROSS REFERENCE TO RELATED APPLICATION

This application is a continuation of application Ser. No. 650,776, filed Sep. 13, 1984, now U.S. Pat. No. 4,670,275.

This application is a continuation-in-part of application Ser. No. 650,776, filed Sept. 13, 1984.

BACKGROUND OF THE INVENTION

1. Field of the Invention

This invention relates to a process for prolonging the shelf life of fresh vegetables. More particularly, it relates to prolonging the shelf life of fresh root crops. This invention especially relates to prolonging the shelf life of carrots by a variety of processes each of which may include one or more of the following operations: a hot water treatment, a cooling step, exposure to vacuum, a coating operation, and a packaging operation.

2. Description of the Prior Art

Fresh fruits and vegetables are extremely perishable commodities. Heretofore many techniques have been employed to protect such food products from oxidative degradation, mold attack and moisture change and to preserve the freshness, texture and color of the fresh produce. One of the earliest means of lengthening the shelf life of fruits and vegetables was refrigeration. However, most fresh produce when stored under reduced temperatures for prolonged periods shows adverse effects on the taste, odor or quality of the product from microbial and mold growth above 35° F. In addition, storage temperatures below 35° F. often show chill injury to the tissue of the produce. Hence, in many instances refrigeration alone is not effective in achieving the desired shelf life for a particular fruit or vegetable.

Coating fresh fruits and/or vegetables is another of these techniques which has been employed with varying degrees of success. Not only must the coating be effective in prolonging the useful shelf life of fresh product, but the appearance of the commodity must not be altered from that of its natural state. At a minimum, this natural appearance must not only remain unchanged but should ideally be enhanced especially when the fruit or vegetable will be displayed for sale. The selection of a coating material is further complicated where the fruit or vegetable is to be consumed in its natural state and it is considered essential that there be no need to remove the coating. In that event, the coating material must not only be edible, it should not affect or alter the natural organoleptic characteristics of the fresh fruit or vegetable.

Typical of these prior art coatings are the wax emulsions of U.S. Pat. Nos. 2,560,820 of Recker and 2,703,760 of Cunning. Coatings of natural materials have been employed including milk whey (U.S. Pat. No. 2,282,801 of Musher), lecithin (U.S. Pat. Nos. 2,470,281 of Allingham and 3,451,826 of Mulder), gelatin together with polyhydric alcohol (U.S. Pat. No. 3,556,814 of Whitman et al.) and protein (U.S. Pat. No. 4,344,971 of Garbutt). Polymers have also been used extensively, viz., a thermoplastic polymer (U.S. Pat. No. 2,213,557 of Tisdale et al.), vinyl acetate polymer (U.S. Pat. No. 3,410,696 of Rosenfield), a hydrophilic polymer (U.S. Pat. No. 3,669,691 of De Long et al.) and the combination of a water soluble polymer and hydrophobic material (U.S. Pat. No. 3,997,674 of Ukai et al.). Cellulosic materials have found utility in coating fruits and vegetables including hydrated cellulose (U.S. Pat. No. 1,774,866 of Beadle), a combination of cellulose and wax (U.S. Pat. No. 2,364,614 of Beatty), cellulose ether in combination with a fatty acid ester (U.S. Pat. No. 3,471,303 of Hamdy et al.) or monoglyceride and a fatty acid metal salt (U.S. Pat. No. 3,461,304 of Hamdy et al.), or a sucrose ester of a fatty acid (U.S. Pat. No. 4,338,342 of Tan et al.).

Food preservation has for many years employed such mutually exclusive processes as dehydration and freezing. Both of these operations often include a heat treatment, known as blanching, which is conducted prior to the dehydration or freezing step. Blanching is said to reduce enzyme or bacteria level and to prevent or minimize undesirable changes during storage in the dry or frozen state, such as changes in color, odor or texture or loss of vitamins. Blanching may be conducted with steam (e.g., U.S. Pat. No. 2,373,521 of Wigelsworth), hot water (U.S. Pat. No. 2,515,025 of Vahl et al.), hot oxygen-free gas (U.S. Pat. No. 3,801,715 of Smith et al.) or hot air (U.S. Pat. No. 3,973,047 of Linaberry et al.).

U.S. Pat. No. 2,780,551 of Guadagni is also concerned with the preservation of raw fruits or vegetables by freezing. A heat pretreatment is employed here also, but it is a mild heat treatment to cause partial enzyme inactivation. The mild heat treatment may be conducted by immersing the food in a liquid which is heated to a temperature in the range of 150° to 212° F. for a period of from about 10 seconds at the higher temperatures to about 10 minutes at the lower temperatures. The heat treatment is described as heating the food at a temperature and for a period of time sufficient to inactivate the enzymes throughout the food and not sufficient to sterilize or cook the food. The combination of mild heat treatment and freezing produces a product which will maintain its fresh color, taste and appearance after prolonged storage.

U.S. Pat. No. 2,619,424 of Masure discloses a process for preparing dehydrated carrots having improved storage qualities. The carrots are dehydrated, then moistened with water, optionally containing starch, and then the carrots are dehydrated to a moisture level below about 10%. The use of starch assists in preserving the color of the final product although the absorbed water is the primary factor in improving the stability of the color and the carotene content.

It is an object of this invention to prolong the post harvest life of the fresh root crops.

It is another object of this invention to improve the shelf life of fresh carrots.

It is a further object of this invention to provide raw carrots in a ready-to-eat form and to improve the shelf life of these fresh carrots.

SUMMARY OF THE INVENTION

These and other objects are achieved by subjecting the raw root vegetable to one of a variety of processes, each of which may include one or more of such operations as a mild heat treatment, a cooling treatment, a vacuum treatment, a coating step or packaging in a sealed container.

In one embodiment, this invention concerns a process of maintaining a fresh root vegetable in a viable form which comprises:

(a) subjecting a fresh root vegetable to a vacuum of less than about 20 inches Hg absolute for about 2 to about 10 minutes,
(b) breaking the vacuum in the presence of water, and
(c) removing surface water from the vegetable. An optional step in this embodiment includes the following additional step conducted after step (c):
(d) providing the vegetable in sealed container effective to prevent microbial recontamination of the vegetable and having a gas permeability effective to maintain the vegetable in a viable condition.

In another embodiment, this invention concerns a process of maintaining a fresh root vegetable in a viable form which comprises:
(a) providing the vegetable in uniform sized pieces, and
(b) providing the vegetable in a sealed container effective to prevent microbial recontamination of the vegetable and having a gas permeability effective to maintain the vegetable in a viable condition.

In yet another embodiment, this invention concerns a process of maintaining a fresh root vegetable in a viable form which comprises:
(a) subjecting a fresh root vegetable having endogenous microflora present therein to elevated temperature and time conditions effective to reduce the microflora concentration in colony forming units (CFU/g) by a factor greater than $10^2$ while substantially maintaining the sensory qualities of color, taste and texture of the fresh root vegetable,
(b) rapidly cooling the heat treated vegetable to below about 25° C. in less than about two minutes, and
(c) providing the vegetable in a sealed container effective to prevent microbial recontamination of the vegetable and having a gas permeability effective to maintain the vegetable in a viable condition.

In an optional embodiment, before it is placed in the sealed container, the vegetable is coated with a hydrocolloid to substantially reduce the availability of clustered and free water.

DESCRIPTION OF THE PREFERRED EMBODIMENT

The present invention relates to a process of improving the useful shelf life of fresh vegetables, particularly root vegetables, especially carrots, The invention also relates to the vegetable produced by this process. In one embodiment this invention relates to carrots prepared as a ready-to-eat raw snack food and provided in a package which may be stored for a period substantially longer than raw fresh carrots which have not been treated by the process of the present invention. Carrots provided in this fashion are ideal for use with party dips or for inclusion in a lunch box or a picnic basket since they require no preparation and can be served or eaten "right out of the package."

The basic purpose of the process of this invention involving a mild heat treatment is to reduce the endogenous microflora present in a raw fresh root vegetable while maintaining the vegetable in a viable form and without undue damage to the vegetable cell tissue so that when it is subsequently eaten, it will provide substantially the same sensory qualities of appearance, odor and taste as the freshly harvested raw vegetable. Without treatment in accordance with this invention, the growth of microflora in the fresh vegetable will in a short time adversely affect the organoleptic qualities of the vegetable even if stored under refrigeration. In those embodiments of this invention, which do not include a mild heat treatment, the treatment and/or the packaging of the fresh root vegetable which is employed minimizes the growth of microflora sufficiently to maintain the fresh quality of the vegetable. By practicing the process of the present invention, the useful shelf life of fresh carrots, for example, can be prolonged by about 14 to about 21 days at a 10° C. storage temperature.

The mild heat treatment employed here is distinguishable from blanching, a well known operation used in the canning, dehydration and freezing of fruits and vegetables. Blanching employs hot water or steam to scald or parboil raw foodstuffs in order to inactivate enzymes which might otherwise cause deterioration, especially of flavor, during processing or storage. In contra distinction, the mild heat treatment of the present invention reduces the microflora content on the surface of the fresh vegetable but does not stop the enzymatic action in the raw vegetable. If the enzymatic action were stopped, the vegetable would no longer be a fresh vegetable. In fact, were blanching to be substituted for the mild heat treatment step in the process of the present invention, the packaged product obtained would have such a poor storage stability that it would be unacceptable for sale to the consumer after only one week of refrigerated storage.

The vegetables which are particularly adapted to the process of the present invention are those which are known collectively as root vegetables or root crops, particularly those which are eaten in the raw state. These vegetables include carrots, turnips, rutabaga and radishes. Carrots are especially well suited to being treated in accordance with the present invention which will be explained below using carrots as the vegetable being processed. This is done for illustration purposes and although carrots are especially preferred when practicing this invention, other root crops, as explained above, may be employed.

In accordance with one embodiment of the present invention, the carrots are subjected to a mild heat treatment to substantially reduce the microflora content, then are rapidly cooled and finally are placed in a sealed container.

In most instances the carrots will be provided in condition whereby the consumer can eat the carrots without any preparation. Thus, before the carrots are shipped to the processing plant to be treated in accordance with the present invention, the harvested carrots should be topped to remove the green leafy top and washed to remove the soil from the exterior surface of the carrots. This can be performed in the field during harvesting or just prior to shipping to the processing and packaging plant. The preparation continues at the plant with peeling of the carrots which may be achieved by any of several known methods:
(a) steam peeling using a batch type peeler such as an Odenberg peeler, K & K Model 100 or an FMC continuous peeler,
(b) lye peeling using a peeler such as an A. K. Robins ferris wheel type employing a lye concentration of 5-20%, or
(c) mechanical peeling using an interchangeable roller type peeler such as a Magnason Model HL. The peels can be removed from the carrots by employing equipment such as an A. K. Robins drum washer or a Magnason Magnu washer with stud rubber and brush rolls.

Since the carrots are to be provided in a ready-to-eat form, the carrots should be of a small diameter variety which are cut to the desired length, usually 3–5 inches. For larger diameter carrots, they should be cut to provide carrot sticks of about 3–5 inches in length and a cross section of about $\frac{1}{4}$–$\frac{1}{2}$ inch by $\frac{1}{4}$–$\frac{1}{2}$ inch.

In the practice of this embodiment of the invention, the initial step is a mild heat treatment. The mild heat treatment must be conducted at a temperature and for a period of time which are effective to reduce the endogenous microflora without causing undue damage to carrot cell tissue which could affect the sensory qualities of a fresh, raw carrot. Excessive heat treatment causes the carrots to have a cooked appearance and taste and to suffer a loss of turgor, i.e., the ability to hold water. In contradistinction, insufficient heat treatment results in no appreciable and consistent reduction of microflora. To be effective, the treatment must cause a reduction of microflora count by a factor of at least $10^2$, preferably at least $10^4$. It is possible when practicing the heat treatment of this invention to reduce the microflora level to below about 3 colony forming units (CFU) per gram of carrots. In one embodiment of the heat treatment, the carrots are immersed for about 20 to about 180 seconds in water maintained at about 45° to about 55° C. Those skilled in the art can determine the optimum conditions for particular carrots without an undue amount of experimentation by evaluating the microflora count before and after a series of heat treatment screening tests. Not only must the heat treatment cause the required reduction in microflora, but the carrots must maintain the organoleptic qualities of odor, appearance, taste and mouth feel evidenced by freshly harvested raw carrots.

The next step involves a rapid cooling of the heat treated carrots. The rapid cooling is necessary to minimize surface cell heat destruction and reduce respiration and other biochemical reactions which adversely affect color, odor, taste and texture. As the carrots are removed from the heat treating step, they are rapidly cooled to below about 25° C., preferably below about 15° C. in less than about 2 minutes. This cooling may be accomplished in various ways, including spraying the carrots with cold water, immersing them in cool water, passing cold air over the carrots, or the like. Other cooling methods known in the art may also be used instead of or in conjunction with any of these cooling methods. In one preferred embodiment, the rapid cooling is achieved by immersing the carrots in cold water, preferably chlorinated (10–250 ppm, preferably 25–100 ppm).

The heat treated and cooled carrots are now ready for the final operation of packaging. The carrots are placed in a sealed package to prevent undue moisture loss as measured by texture and weight loss and to prevent microbial recontamination. The packaging material should have a gas permeability effective to permit sufficient respiration for maintaining the carrot tissue in a viable condition. Typically, useful packaging materials should have a gas permeability of about 50 to about 300, preferably about 75 to about 200, cc of $O_2$/100 in$^2$-atm.-24 hrs. and about 200 to about 800, preferably about 400 to about 600, cc of $CO_2$/100 in$^2$-atm.-24 hrs. and a moisture transmission rate of less than about 1.5, preferably less than about 0.5, g/100 in$^2$-24 hrs-90% R.H., 70° F. Further, the ratio of product mass to package surface should be in the range of about 1 to about 6 g/in$^2$. Packages can be made from flexible or semi-rigid materials in various shapes and forms including three sided pouches and thermoformed tubs to provide an attractive, eye-catching package. Foamed polypropylene has been found to be a useful packaging material in the practice of this invention.

For maximum shelf life, the packaged carrots should be maintained under refrigeration at a temperature of above 2 to below 15° C., preferably about 2° to about 4° C. Packaged carrots prepared in accordance with the process of this invention have a shelf life of about 14 to about 21 days longer than packaged carrots which have not been similarly processed.

Although the heat treating, cooling and packaging of the carrots in accordance with this embodiment significantly improves the shelf life of the fresh carrots, several other optional steps may be included in the process of this embodiment to further enhance the shelf life and/or the appearance of the carrots.

Thus, following the rapid cooling of the carrots by any of the methods described above, the carrots are preferably subjected to a vacuum of less than about 20 inches Hg absolute, preferably in the range of about 1 to about 12 inches Hg absolute, for about two to about ten minutes in the presence or absence of water, which may optionally be chlorinated (10–250 ppm, preferably 25–100 ppm). The vacuum should be broken in the presence of water, preferably chlorinated (10–250 ppm, preferably 25–100 ppm). This may be accomplished by having the carrots immersed in water or by spraying water over the carrots when the vacuum is broken. Ideally, this use of vacuum can be accomplished in conjunction with a vacuum cooling which is one of the preferred cooling techniques. Breaking the vacuum in the presence of water significantly improves the color of the carrot pieces in that the color looks brighter and deeper as compared to carrot pieces not so treated. This is thought to be caused by the removal of inter and intra cellular gases and replacing them with water. Employing chlorinated water here will provide an additional benefit in that the initial microflora will be further reduced, further prolonging shelf life. Breaking the vacuum with chlorinated water when used in combination with the hot water heat treatment provides a synergistic improvement.

Since the cooled carrots may contain surface water after they are cooled and, optionally, subjected to vacuum conditions, this water should be removed before the carrots are further processed. Any of several known techniques can be employed, such as, centrifuging or contacting with dry air at temperatures of about 10° to about 20° C. or the like.

In another optional embodiment the heat treated and cooled carrots may be provided with a coating before they are placed in the sealed protective package. This coating controls the state of water at the carrot's surface. It also acts as a partial barrier to oxygen and carbon dioxide exchange thus further slowing biochemical reactions and prolonging shelf life. Since, ideally, the coating will be consumed when the carrots are eaten, the coating material selected should not only be edible, it must not adversely affect the natural taste of raw carrots. Further, the coating material should enhance the surface appearance of the carrots when they are displayed for sale.

Previous studies have determined that microorganisms do not grow in an environment of restricted water availability and some consider that the partial pressure of the water vapor, in equilibrium with the growth media, such as a food product, is the criterion of the water availability. It now appears that this criterion is the thermodynamic state of the water rather than the equilibrium relative humidity. More specifically, the relative humidity is related to the average fugacity or escaping tendency of water. Bacteria, on the other hand, grow only in the presence of water molecules influenced by an outside force and associated with other water molecules, i.e., clustered water, rather than in the presence of water associated with a single polar bonding site on macromolecules, i.e., bound water. There is another type of water involved here, free water, which is water associated with other water molecules and not influenced by any other outside force. Thus, the moisture found in and around carrots can be of three types: clustered water, bound water or free water. The latter is not associated either directly or indirectly with macromolecules molecules and is usually found in the vicinity of or on the surface of the carrots.

Macromolecules such as hydrocolloids are ideally suited for use as a coating material, provided they meet the organoleptic standards as well. Hydrocolloids such as microcrystalline cellulose or modified tapioca starch are particularly preferred. Typically coatings of these materials constitute about 0.05 to about 1.0 of the weight of the carrot. The hydrocolloid coating must be effective to substantially reduce the availability of clustered and free water at the surface of the carrots. The hydrocolloids can also slow down the permeation of oxygen from the environment into the carrot tissue and the permeation of carbon dioxide from the tissue into the surrounding environment.

Other embodiments of this invention provide effective control of the endogenous microflora present in fresh carrots without employing either the mild heat treatment or hydrocolloid coating described above. In one such embodiment, subjecting the fresh carrots to only one of the optional steps described above provides satisfactory control of the microflora growth and thus an extended shelf life. In this embodiment, fresh carrots are subjected to vacuum of less than about 20 inches Hg absolute (i.e., a vacuum of less than about 10 inches Hg gauge, preferably in the range of about 1 to about 12 inches Hg absolute, for about two to about ten minutes in the presence or absence of water which may optionally be chlorinated (10–250 ppm, preferably 25–100 ppm). The vacuum is then broken in the presence of water, which preferably is chlorinated (10–250 ppm, preferably 25–100 ppm), and finally the surface water is removed, all as described hereinbefore. Following this preparation the carrots are packaged in a sealed container as described above in the other embodiments. This somewhat simpler processing provides an unexpectedly prolonged shelf life for the fresh carrots. Although the shelf life achieved with this embodiment is not as long as that obtained when the processing includes a mild heat treatment, this embodiment is preferred to that employing mild heat treatment because it is more economical and because the prolonged shelf life that is obtained is sufficient for most commercial marketing of fresh carrots.

Another embodiment, which is also attractive because it is more economical than others described herein, requires no processing operations other than providing the fresh carrots in uniform sized pieces and then packaging them as described above in a sealed container which prevents microbial recontamination and which has a gas permeability effective to maintain the vegetable in a viable condition. Even in this simplified embodiment, the shelf life of the fresh vegetable is extended appreciably although not to the extend obtained in the other embodiments of this invention. Nonetheless this particular embodiment is economically attractive in those situations where extremely long shelf life is not required such as those commercial operations experiencing a rapid turnover of the packaged fresh carrots.

In both of these latter two embodiments, the carrots are ideally provided as a ready-to-eat snack food in a package which permits their being service or eaten "right out of the package." Therefore, the harvested carrots should be topped, washed and, if necessary, peeled before being provided in uniform sized pieces, all as described above. Thus, the carrots could be provided in carrot stick form or in "as grown" size where a variety is chosen which provides bite-sized whole carrots.

The following examples illustrate the practice of the invention.

EXAMPLE I

The effect of hot water treatment on the initial aerobic microbial count of fresh carrots was evaluated.

A number of fresh carrots washed, peeled and cut into $3'' \times \frac{3}{8}'' \times \frac{3}{8}''$ sticks. The carrot sticks were subjected to various hot water treatments, and then the initial aerobic microbial count of the treated carrots in terms of colony forming units (CFU) per gram was measured.

The various treatments and the results are shown in Table I below. These data indicate that the appearance and taste of fresh carrots can be substantially retained when subjecting the carrots to hot water treatment while significantly reducing the surface microbial count.

TABLE I

| The Effect of Hot Water Treatment on Initial Aerobic Microbial Count of Fresh Carrots | | |
|---|---|---|
| Description | Initial C.F.U./gram | Initial Observation |
| Fresh Prepared Carrots No Hot Water Treatment | $3.0 \times 10^4$ | Semi-dry surface, good flavor Medium-high rigidity, light orange color |
| Agitated Water @ 45° C. Immersion time: 1 minute | $1.0 \times 10^3$ | Medium rigidity, good flavor and texture, slightly moist surface |
| Agitated Water @ 45° C. Immersion time: 3 minutes | $3.0 \times 10^2$ | Medium rigidity, slight flavor loss, moist surface, color not as intense as with higher temperature |
| Agitated Water @ 55° C. Immersion time: 1 minute | <3 | Medium rigidity, good carrot flavor, slightly moist orange surface |
| Agitated Water @ 55° C. | <3 | Medium to soft rigidity, slight |

TABLE I-continued

The Effect of Hot Water Treatment on Initial Aerobic Microbial Count of Fresh Carrots

| Description | Initial C.F.U./gram | Initial Observation |
|---|---|---|
| Immersion time: 3 minutes | | cooked taste, some flavor loss, orange moist surface |
| Agitated Water @ 60° C. Immersion time: 3 minutes | <3 | Soft, rubbery texture, cooked flavor, good orange color |
| Agitated Water @ 65° C. Immersion time: 1 minute | <3 | Medium rigidity, slight cooked flavor, orange moist surface |
| Agitated Water @ 65° C. Immersion time: 3 minutes | <3 | Soft, rubbery texture, cooked flavor, orange moist surface |
| Agitated Water @ 70° C. Immersion time: 0.50 minutes | <3 | Medium rigidity, moist orange surface, slight flavor loss |
| Agitated Water @ 70° C. Immersion time: 0.75 minutes | <3 | Medium to soft rigidity, moist orange surface, flavor loss more extensive |

EXAMPLE II

The effect of hydrophilic polymer on the shelf-stability of hot water treated carrots was evaluated.

A number of carrots were prepared in stick form as in Example I and were then subjected to a series of hot water treatments and polymer coatings. After the treated carrots were stored for 13 days at about 10° C., the microbial count of each sample was measured.

A description of the various treatments and the results of the evaluation are shown in Table II below. These date indicate that a coating of a hydrophilic polymer can significantly improve the storage stability of fresh carrots which have been treated with hot water to reduce the microflora content of the carrots.

TABLE II

The Effect of Hydrophilic Polymers on The Shelf-Stability of Hot Water Treated Fresh Carrots

| Description | Colony Forming Units per gram After Storage |
|---|---|
| Control | |
| Agitated Water @55° C. Immersion time: 2.5 minutes | >4.0 × $10^{10}$ |
| Agitated Water @55° C. Immersion time: 2.5 minutes Polymer/Usage: 0.05% Microcrystalline Cellulose | 2.2 × $10^8$ |
| Agitated Water @55° C. Immersion time: 2.5 minutes Polymer/Usage: 0.1% Microcrystalline Cellulose | 1.4 × $10^9$ |
| Agitated Water @55° C. Immersion time: 2.5 minutes Polymer/Usage: 0.2% Microcrystalline Cellulose | 1.0 × $10^8$ |
| Agitated Water @55° C. Immersion time: 2.5 minutes Polymer/Usage: 0.2% Tapioca Starch | <2.0 × $10^9$ |

EXAMPLE III

The effect of hot water treatment and vacuum on the storage stability of carrots was evaluated.

A number of fresh carrots were prepared in stick form as in Example I and were then subjected to various combinations of hot water treatment and vacuum. The microbial count of the treated carrots was measured immediately after the various treatments and again after prolonged storage at about 10° C. which ranged from 15 to 27 days.

A description of the various treatments and the results of the evaluation are presented in Table III. These data indicate that the combination of hot water treatment and vacuum have a synergistic effect in controlling microbial growth in fresh carrots.

TABLE III

The Synergistic Affect of Hot Water Treatment and Vacuum in Controlling Microbial Growth

| Description | Initial C.F.U./gram | Storage Time (Days) | C.F.U./gram <$10^{13}$ |
|---|---|---|---|
| Fresh prepared carrots | 3.7 × $10^4$ | 15 days | 5.8 × $10^{13}$ |
| Chlorinated Water soak 5 minutes (50–100 ppm) | 3 × $10^3$ | 15 | 2.5 × $10^{13}$ |
| Chlorinated Water Soak 5 minutes (50–100 ppm) Vacuum 28" Hg for 5 minutes, broken with chlorinated water | 1.6 × $10^3$ | 17 | 3.1 × $10^{12}$ |
| Hot Water Treatment 55° C. for 2 minutes | <3.9 × $10^2$ | 15 | 8.2 × $10^{15}$ |
| Hot Water Treatment 55° C. for 2 minutes Vacuum 28" Hg for 5 minutes, broken with chlorinated water | Neg. | 27 | 8.7 × $10^{11}$ |

EXAMPLE IV

The effect of the use of vacuum and chlorinated water on the storage stability of carrots was evaluated.

A number of fresh carrots were washed, peeled and cut into 3"×⅜"×⅜" sticks. The carrots were subjected to one of three water treatments, spun dry and packaged in foamed polypropylene film packages. The water treatments evaluated were:

| | |
|---|---|
| Vacuum Conditions, Chlorinated Water | A vessel containing a body of chlorinated water (25–100 ppm) and having a platform above the water was employed. The carrots were placed on the platform and a vacuum of 28 inches Hg gauge was pulled on the vessel. After five minutes the carrots were dumped into the body of water for one minute. The vacuum was broken. |
| Atmospheric Conditions, Chlorinated Water | The carrots were soaked in chlorinated water (25–100 ppm) for 5 minutes at atmospheric conditions. |
| Atmospheric Conditions, Unchlorinated Water | The carrots were soaked in unchlorinated water for 5 minutes at atmospheric conditions. |

TABLE IV

| | Days of Acceptable Quality of Carrot Sticks | |
|---|---|---|
| | 10° C. Storage | 3° C. Storage |
| Vacuum Conditions, Chlorinated Water | 50 | 70 |
| Atmospheric Conditions, Chlorinated Water | 40 | 55 |
| Atmospheric Conditions, Unchlorinated Water | 25 | — |

These data indicate that the use of chlorinated water under vacuum conditions provides superior storage stability of fresh carrot sticks.

What is claimed is:

1. A process of maintaining a fresh root vegetable in a viable form which comprises:
   (a) peeling the surface of a fresh root vegetable,
   (b) providing the vegetable in uniform sized pieces,
   (c) subjecting the vegetable to a vacuum of less than about 20 inches Hg absolute for about 2 to about 10 minutes,
   (d) breaking the vacuum in the presence of chlorinated water,
   (e) removing surface water from the vegetable, and
   (f) providing the vegetable in a sealed container effective to prevent microbial recontamination of the vegetable and having a gas permeability and a ratio of the mass of vegetable to the container surface effective to maintain the vegetable in a viable condition.

2. A process of maintaining a fresh root vegetable in viable form which comprises:
   (a) peeling the surface of a fresh root vegetable,
   (b) providing the vegetable in uniform sized pieces,
   (c) contacting the vegetable with chlorinated cold water under atmospheric conditions for up to about five minutes,
   (d) removing surface water from the vegetable, and
   (e) providing the vegetable in a sealed container effective to prevent microbial recontamination of the vegetable and having a gas permeability and a ratio of the mass of vegetable to the container surface effective to maintain the vegetable in a viable condition, with the proviso that said vegetable is not subjected to heat treatment during said process.

3. A process according to claims 1 or 2 including the following steps conducted prior to step (a) of claim 1 or step (a) of claim 2, respectively:
   removing the green leafy top of the fresh root vegetable, and
   effectively washing the exterior surface of the vegetable to remove soil.

4. A process according to claim 1 wherein in step (c), the vacuum is about 1 to about 20 inches Hg absolute and chlorinated water is present while the vegetable is subjected to vacuum.

5. A process according to claims 1 or 2 wherein the sealed container of step (f) of claim 1 or step (e) of claim 2, respectively, has the following properties:
   a gas permeability of about 50 to about 300 cc of $O_2$/100 in$^2$-atm.-24 hrs., about 200 to about 800 cc of $CO_2$/100 in$^2$-atm.-24 hrs. and a moisture transmission rate of less than about 1.5 g/100 in$^2$-24 hrs. -90% R.H., 70° F. and a ratio of the mass of the vegetable to the container surface of about 1 to about 6 g/in$^2$.

6. A process according to claims 1 or 2 wherein the sealed container of step (f) of claim 1 or step (e) of claim 2, respectively, comprises foamed polypropylene.

7. A process according to claims 1 or 2 wherein the vegetable is carrots, turnips, rutabaga or radishes.

8. A process according to claim 7 wherein the vegetable is carrots.

9. The product prepared by the process of claims 1, 2 or 4.

10. The product prepared by the process of claim 3.
11. The product prepared by the process of claim 5.
12. The product prepared by the process of claim 6.
13. The product prepared by the process of claim 7.
14. The product prepared by the process of claim 8.

* * * * *